(12) United States Patent
Plazak et al.

(10) Patent No.: US 11,837,206 B2
(45) Date of Patent: Dec. 5, 2023

(54) MULTIDIMENSIONAL GESTURES FOR MUSIC CREATION APPLICATIONS

(71) Applicant: Avid Technology, Inc.

(72) Inventors: Joseph Plazak, Verdun (CA); Sam Butler, Hanley Swan (GB)

(73) Assignee: Avid Technology, Inc., Burlington, MA (US)

( * ) Notice: Subject to any disclaimer, the term of this patent is extended or adjusted under 35 U.S.C. 154(b) by 241 days.

(21) Appl. No.: 17/443,598

(22) Filed: Jul. 27, 2021

(65) Prior Publication Data

US 2023/0032765 A1 Feb. 2, 2023

(51) Int. Cl.
| | |
|---|---|
| *G06F 3/00* | (2006.01) |
| *G10H 1/00* | (2006.01) |
| *G06F 3/04817* | (2022.01) |
| *G06F 3/0488* | (2022.01) |
| *G06F 3/0354* | (2013.01) |

(52) U.S. Cl.
CPC ....... *G10H 1/0025* (2013.01); *G06F 3/03545* (2013.01); *G06F 3/0488* (2013.01); *G06F 3/04817* (2013.01); *G10H 2210/525* (2013.01); *G10H 2220/096* (2013.01); *G10H 2220/106* (2013.01)

(58) Field of Classification Search
None
See application file for complete search history.

(56) References Cited

U.S. PATENT DOCUMENTS

| | | | |
|---|---|---|---|
| 6,094,197 A | 7/2000 | Buxton et al. | |
| 7,098,896 B2 | 8/2006 | Kushler et al. | |
| 8,059,101 B2 | 11/2011 | Westerman et al. | |
| 8,686,962 B2 | 4/2014 | Christie | |
| 9,747,876 B1 * | 8/2017 | Clarke | G10H 1/0008 |
| 2004/0139843 A1 * | 7/2004 | Forster | G09B 15/02 84/483.2 |
| 2012/0247305 A1 * | 10/2012 | Katsuta | G09B 15/023 84/477 R |
| 2015/0082974 A1 * | 3/2015 | Soejima | G09B 15/023 84/609 |
| 2016/0360852 A1 * | 12/2016 | Hering | A45D 24/02 |
| 2017/0243506 A1 * | 8/2017 | Bayadzhan | G09B 15/023 |
| 2018/0218480 A1 * | 8/2018 | Yamamoto | G06T 7/0002 |
| 2019/0348013 A1 * | 11/2019 | Kubita | G10H 1/0016 |
| 2021/0151017 A1 * | 5/2021 | La | G10H 1/0008 |
| 2022/0172640 A1 * | 6/2022 | Aharonson | G10G 1/00 |

* cited by examiner

*Primary Examiner* — Toan H Vu

(74) *Attorney, Agent, or Firm* — Oliver Strimpel (57) ABSTRACT

A graphical user interface for music creation applications, such as score notation applications and digital audio workstations, includes multi-dimensional gestures. To enter a sound event into a musical project, a user uses an input device to select and drag a desired sound event in one or more dimensions. The relative position or rate of movement along a given dimension defines a value of a sound event parameter allocated to the given dimension. The sound event is entered into the project when the selection is released. The user inputs the gesture using a pointing device such as a mouse, stylus with a touch screen, or finger on a touch screen. Stylus dimensions mapped to sound event parameters may include, horizontal and vertical stylus tip positions, vertical and horizontal tilt of the stylus, and stylus tip pressure. Sound event parameters controlled by the gestures may include diatonic pitch, chromatic inflection, and duration.

22 Claims, 7 Drawing Sheets

MULTIDIMENSIONAL GESTURES FOR MUSIC CREATION APPLICATIONS

BACKGROUND

Legacy music creation applications such as score notation programs and digital audio workstations were designed to run on desktop or laptop computers. Their user interfaces rely heavily on mouse and keyboard input. These interfaces are cumbersome, unintuitive, and inefficient when used with touchscreen devices such as tablets, smartphones, and computers equipped with touchscreens. There is therefore a need for user interfaces for music creation applications that are adapted to modern devices and that take advantage of their touch screens and other input devices such as a stylus.

SUMMARY

Gestures are used to input sound events into music creation applications. The gestures may be multi-dimensional, with movement and/or position in a given dimension defining a value of a sound event parameter.

In general, in one aspect, a method of entering data into a music creation application comprises: enabling a user of the music creation application to perform a gesture, wherein the gesture includes using one of a finger and an input device to: select a musical symbol displayed at a given location on a user interface of the music creation application for placement in a musical project; without releasing the selection, move the one of a finger and an input device in a plurality of dimensions, wherein each dimension of the plurality of dimensions is mapped to a corresponding parameter of the musical symbol, and the magnitude of the movement along a given dimension controls a value of the parameter corresponding to the given dimension; and release the selection to cause the musical symbol to be placed in the musical project with parameter values defined by the movement of the one of a finger and an input device in the plurality of dimensions.

Various embodiments include one or more of the following features. The musical symbol is a note of a specified duration. A first dimension of the plurality of dimensions is a vertical dimension and a magnitude of movement along the first dimension defines a diatonic pitch of the note. A first dimension of the plurality of dimensions is a vertical dimension and a magnitude of movement along the first dimension defines a chromatic inflection of the note. A second dimension of the plurality of dimensions is a horizontal dimension and a magnitude of movement along the second dimension defines a chromatic inflection of the note. A second dimension of the plurality of dimensions is a horizontal dimension and a magnitude of movement along the second dimension defines a diatonic pitch of the note. The gesture includes using a stylus input device and a vertical tilt of the stylus is mapped to a temporal duration of the selected musical symbol and a horizontal tilt is mapped to a chromatic inflection of the selected musical symbol. The gesture includes using a stylus input device, and the plurality of dimensions includes: a vertical dimension that defines a diatonic pitch of a selected musical symbol; a horizontal dimension that defines a temporal location at which the selected musical symbol is to be placed; a vertical tilt dimension that defines a chromatic inflection of the selected musical symbol; and a horizontal tilt dimension that defines a rhythmic duration of the musical symbol. The gesture includes using a stylus input device, and the plurality of dimensions includes: a vertical dimension that defines a diatonic pitch of a selected music symbol; a horizontal dimension that defines a temporal location at which the selected musical symbol is to be placed; a vertical tilt dimension that defines a rhythmic duration of the selected musical symbol; and a horizontal tilt dimension that defines a chromatic inflection of the musical symbol. The gesture includes using a stylus input device, and a stylus tip pressure on a tablet toggles between selecting a note for entry into the musical project and selecting a rest for entry into the musical project. The gesture includes using a stylus input device, and a stylus tip pressure activates the user interface of the music creation application to accept gestures that involve a tilt of the stylus along one or more angular dimensions. The gesture is input via a mouse; selecting the musical symbol comprises clicking a button of the mouse; and the motion in the plurality of dimensions comprises moving in a horizontal dimension and a vertical dimension while continuing to press the mouse button. The selected musical symbol is a musical note of a specified duration; movement in the vertical dimension controls a diatonic pitch of the musical note; and movement in the horizontal dimension controls a chromatic inflection of the musical note. The selected musical symbol is a musical note of a specified duration; movement in the vertical dimension controls a chromatic inflection of the musical note; and movement in the horizontal dimension controls a diatonic pitch of the musical note. A dimension of the plurality of dimensions is mapped to a parameter defining a duration of a musical rest. A first dimension of the plurality of dimensions is mapped to a diatonic pitch of the selected musical symbol and a second dimension of the plurality of dimensions is mapped to a rhythmic duration of the selected musical symbol. A first dimension of the plurality of dimensions is mapped to a string position within a guitar tablature (TAB) staff and a second dimension of the plurality of dimensions is mapped to a fret number.

In general, in another aspect, a computer program product comprises: a non-transitory computer-readable medium with computer-readable instructions encoded thereon, wherein the computer-readable instructions, when processed by a processing device instruct the processing device to perform a method of entering data into a music creation application, the method comprising: enabling a user of the music creation application to perform a gesture, wherein the gesture includes using one of a finger and an input device to: select a musical symbol displayed at a given location on a user interface of the music creation application for placement in a musical project; without releasing the selection, move the one of a finger and an input device in a plurality of dimensions, wherein each dimension of the plurality of dimensions is mapped to a corresponding parameter of the musical symbol, and the magnitude of the movement along a given dimension controls a value of the parameter corresponding to the given dimension; and release the selection to cause the musical symbol to be placed in the musical project with parameter values defined by the movement of the one of a finger and an input device in the plurality of dimensions.

In general, in another aspect, a system comprises: a memory for storing computer-readable instructions; and a processor connected to the memory, wherein the processor, when executing the computer-readable instructions, causes the system to perform a method of entering data into a music creation application, the method comprising: enabling a user of the music creation application to perform a gesture, wherein the gesture includes using one of a finger and an input device to: select a musical symbol displayed at a given location on a user interface of the music creation application for placement in a musical project; without releasing the selection, move the one of a finger and an input device in a plurality of dimensions, wherein each dimension of the plurality of dimensions is mapped to a corresponding parameter of the musical symbol, and the magnitude of the movement along a given dimension controls a value of the parameter corresponding to the given dimension; and release the selection to cause the musical symbol to be placed in the musical project with parameter values defined by the movement of the one of a finger and an input device in the plurality of dimensions.

DETAILED DESCRIPTION

Multi-dimensional gestures using an input device such as a stylus replace multiple keyboard and mouse commands. The gestures may be used for creating and editing sound events across a range of music creation applications. Examples of such applications include music notation software, such as Sibelius®, a product of Avid Technology, Inc., of Burlington, Massachusetts, and digital audio workstations, such as Pro Tools®, also a product of Avid Technology, Inc. As used herein, a sound event refers to a musical note symbol, MIDI data, or other representation of an audio event. Sound control events include other symbols used in a musical project, such as crescendo/diminuendo lines, pedal lines, and text items. A musical project may be represented by a musical score with one or more staves or may include MIDI data represented on a timeline of a digital audio workstation.

As used herein, a gesture is a movement using an input device designed to express an idea. A multidimensional gesture is a gesture defined in more than one spatial dimension, such as a horizontal and a vertical dimension. With a mouse, a gesture may be defined by two movement directions—left/right, and up/down, as well as the absence or presence of button states. Using a stylus as input to a touchscreen computer may involve gestures that include not only horizontal and vertical stylus movements, but also parameters such as the amount of pressure applied to the stylus, the horizontal and vertical tilt of the stylus, and tap recognition gestures that may be captured by the sensors within the stylus.

An intuitive mapping of the dimensions of a multidimensional gesture in a music notation application is to map the vertical position of a finger on a touchscreen or of an input device such as a stylus to the pitch of a musical event and to customize other dimensions to map onto other musical parameters such as note duration, dynamics, volume, and chromatic inflection. This enables a single gesture to control the input of all the parameters that define a musical note. The gesture input methods serve to define the values of the parameters to which they are mapped. Thus, for example, if an input gesture dimension is mapped to the diatonic pitch parameter, the value of the diatonic pitch parameter is defined by motion of the allocated gesture, with the available values ranging from the lowest note playable by the instrument that is to play the note to the highest.

Figure 1:
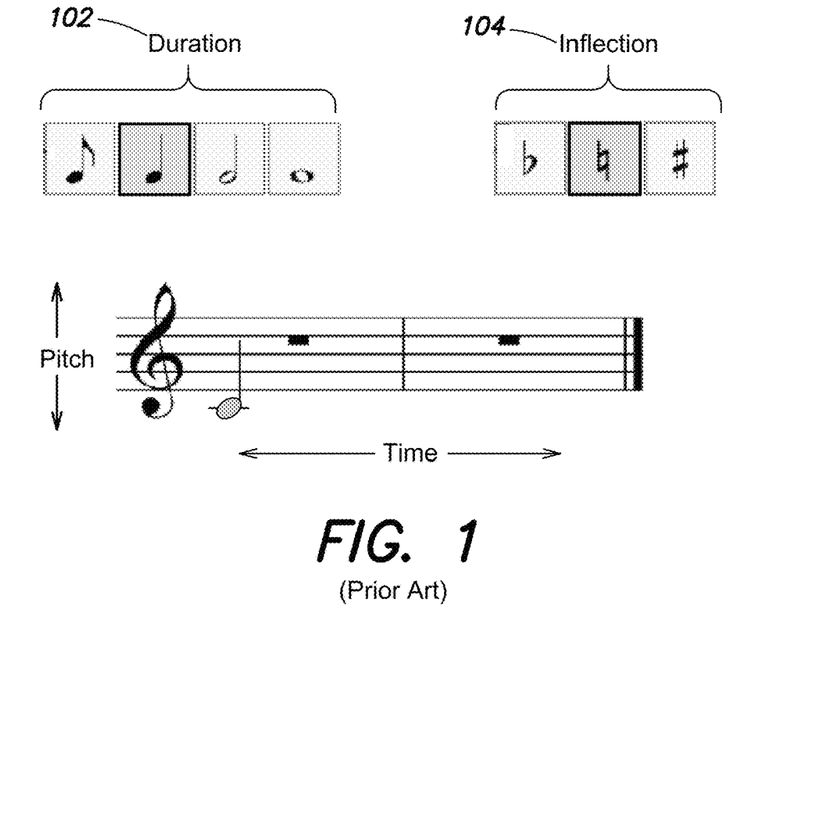
FIG. 1 is a schematic illustration of a portion of the user interface of a prior art music creation application.

In prior art music notation applications, the input of a note is a multistep process, as illustrated in FIG. 1. Typically, a user issues a number of discrete commands to set the state of the object that one wishes to add to the project, and thereafter, places the item into the project via a 2-dimensional (x,y) input device, such as a mouse, stylus, or finger tap. The discrete commands are commonly performed by selecting parameters, such as by clicking on icons 102, 104 displayed within a graphical user interface of a music creation application. The discrete commands involve (i) activating note input mode, (ii) selecting the rhythmic value of the note to be inserted, (iii) specifying the diatonic name of the pitch via keyboard shortcuts or mouse movements and clicks, and finally, if required, (iv) adding a chromatic inflection (flat, natural, sharp). Once the parameters have been determined, the user places the note into the project. Thus, for each added note, up to five actions are required of the user. Using the method described herein, the five steps are condensed into one or at most two multidimensional gestures.

Figure 2:
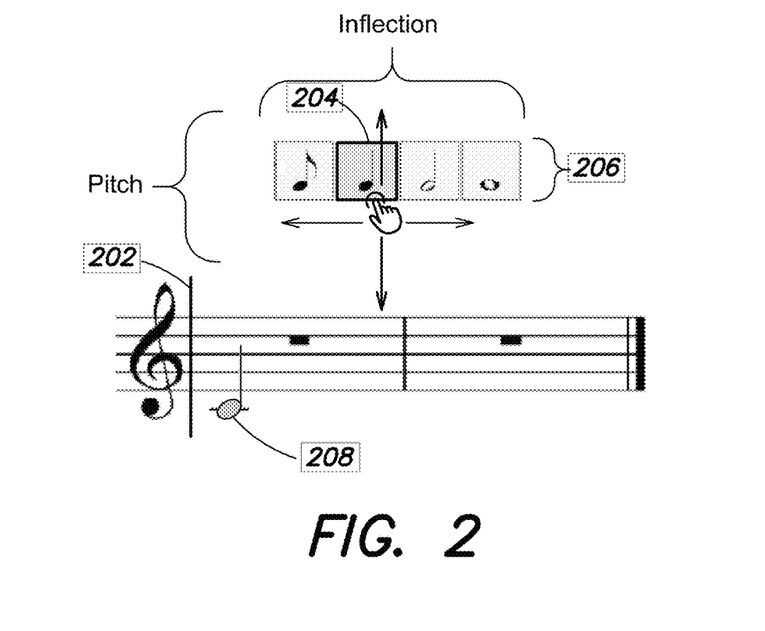
FIG. 2 is a schematic illustration of a portion of user interface for a music creation application that enables the entry of a musical note via a multi-dimensional gesture.
Figure 3:
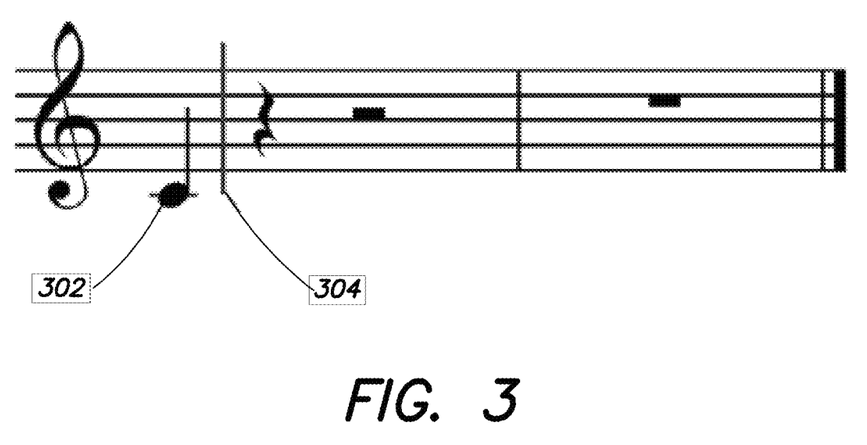
FIG. 3 illustrates the entry of a note into a musical project following completion of a multi-dimensional gesture.

FIG. 2 illustrates the use of multidimensional gestures in music notation software using a touchscreen. The user optionally touches the location within the musical project where a new note is to be placed. If no selection is made, the note may be entered at the beginning of the score, or, if notes have already been entered, after the last note entered. Insertion point 202 is indicated in the score. The user then touches and holds icon 204 from set of note duration icons 206 thus specifying the desired note duration, and then drags their finger vertically to set the diatonic placement of the note and horizontally to set the chromatic inflection of the note. In various implementations, the allocation of dimensions is reversed, with horizontal position mapped to diatonic pitch and vertical position mapped to chromatic inflection. The note is placed in the score when the finger is withdrawn. Feedback is continuously displayed in situ by displaying ghost note 208 reflecting the current parameters selected by the gesture. The ghost note may be shown in grey, or using another color, texture, or graphical indication to indicate the provisional status of the note. When the gesture is completed by releasing the touch, the ghost note is replaced by regular note 302, e.g., in black, to indicate that the note has been entered, as illustrated in FIG. 3. The notation software may assume that the user wishes to enter another note immediately following the newly entered note, and as illustrated in FIG. 3, advance insertion location cursor 304 accordingly. This obviates the need to specify where in the score the next note is to be placed. The user can override this by touching the score at a different location to specify where the next note is to be entered.

Figure 4:
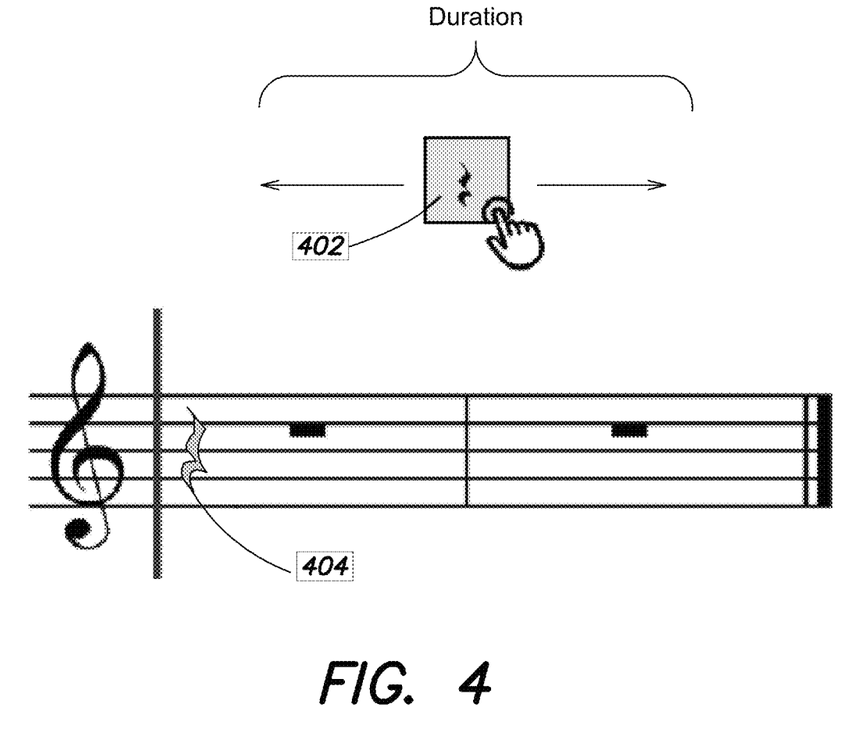
FIG. 4 illustrates the user of a one-dimensional gesture for input of a rest into a musical project.

FIG. 4 illustrates an example of a one-dimensional gesture input in which rest icon 402 is selected and a horizontal dragging motion is used to specify the rest duration with ghost rest 404 providing feedback to the user as to the parameter value (in this case, rest duration) currently specified.

Figure 5:
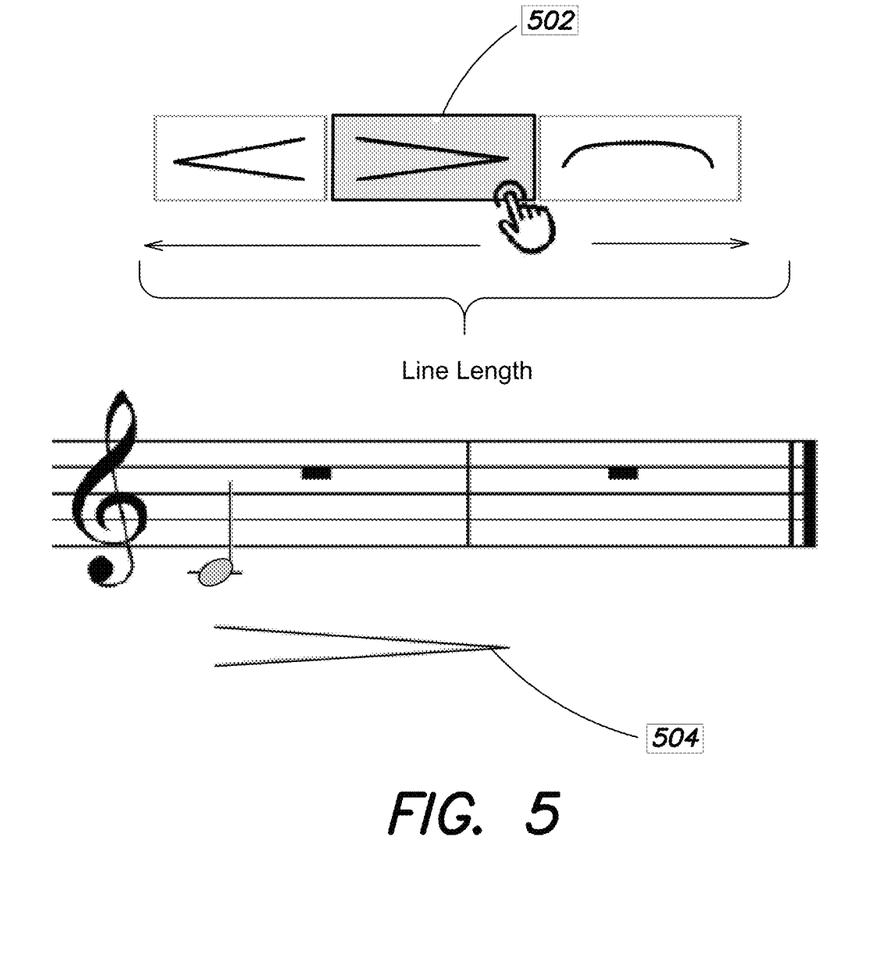
FIG. 5 illustrates the use of a one-dimensional gesture for entry of a line into a musical project.

In another implementation, the user selects a location in the score, then uses a finger or input device to select a line, such as crescendo/diminuendo or pedal, to be added, and then drags left or right to adjust the length of the line. This is illustrated in FIG. 5, with the user selecting diminuendo symbol 502, and dragging from the initially selected location on the icon to define line length, with feedback provided with ghosted symbol 504.

Within a given notation software application user interface, certain selectable icons may cause parameter values to be specified in a discrete manner, e.g., by a simple mouse click, stylus tap, or touch, while others are gesture-enabled, i.e., they are selected and dragged in a single gesture as described above.

Figure 6:
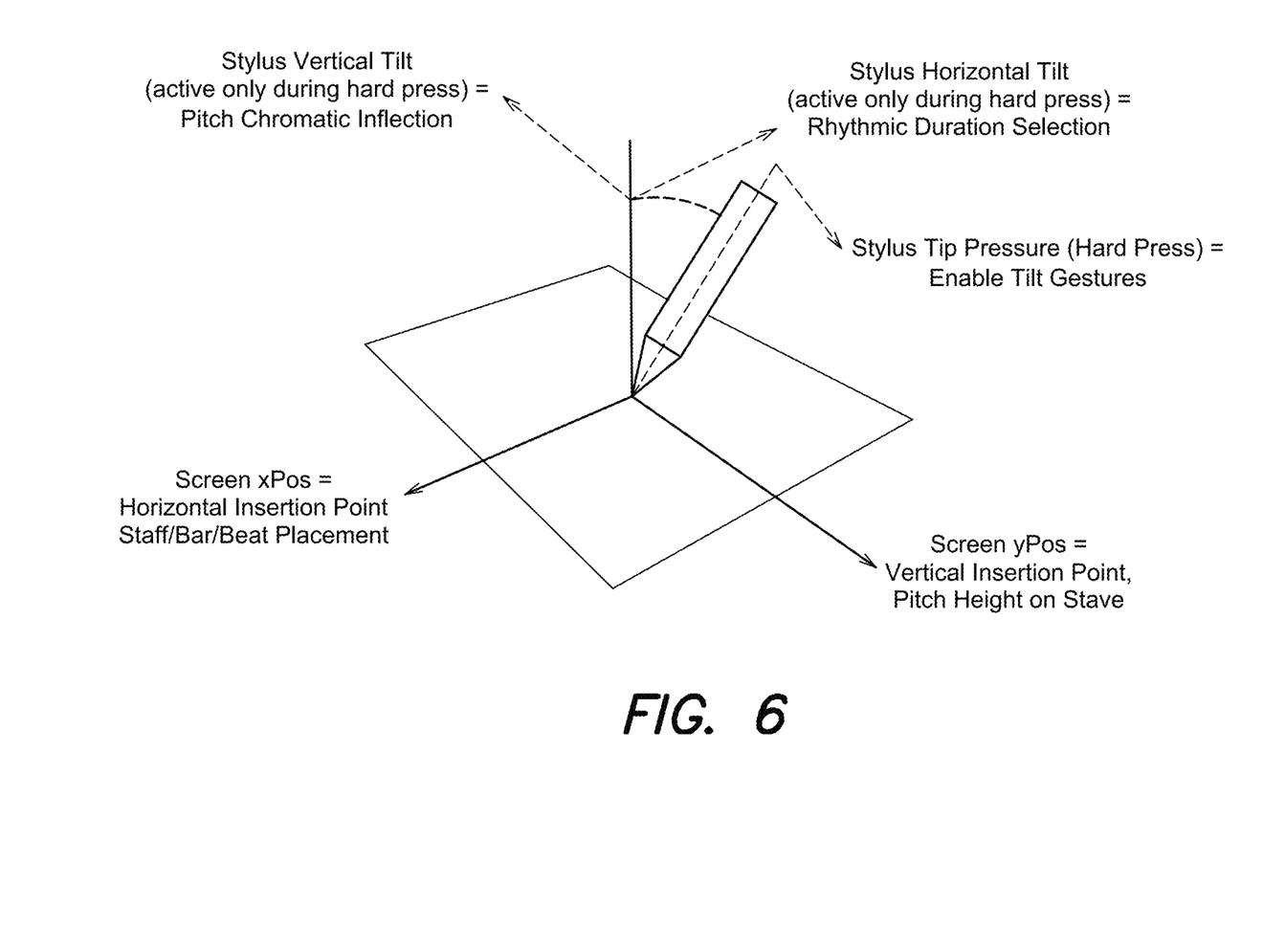
FIG. 6 illustrates the use of a stylus with a touch screen for entry of musical control events using multi-dimensional gestures.

FIG. 6 illustrates the use of multidimensional gestures in music software notation software using a stylus with a compatible touchpad. An example of such a system is the Apple Pencil®, a product of Apple Computer, Inc., of Cupertino, California. The stylus facilitates the use of a gesture with more than three dimensions, up to and including five-dimensional gestures, with each dimension controlling a different musical parameter. The figure illustrates the following allocation of dimensions to musical parameters: (i) x position the stylus point defines the location within the score at which the note is to be entered; (ii) y position of the stylus point defines the diatonic pitch of the note on the stave; (iii) stylus tilt in the y direction defines the chromatic inflection of the note; (iv) the stylus tilt in the x direction defines the rhythmic duration of the note; and (v) stylus tip pressure activates the tilt gestures, and may also recalibrate the initial tilt values to the current values. In various implementations, the stylus tip pressure toggles between states in order to define whether to enter a sounding note or a rest. In another mapping of the stylus gesture dimensions to musical parameters, assigns the stylus x position to the temporal location within the score, the y position to the diatonic pitch, and the tip pressure to "engrave" the note into place. Other parameter value selections via gesture input may include the selection and dragging of a line, such as "hairpin" crescendo and diminuendo symbols and pedal lines. The user makes a selection of the desired line object, and then uses horizontal dragging to define the temporal duration of the desired line, and optionally vertical dragging to define the vertical location with respect to the stave.

Figure 7:
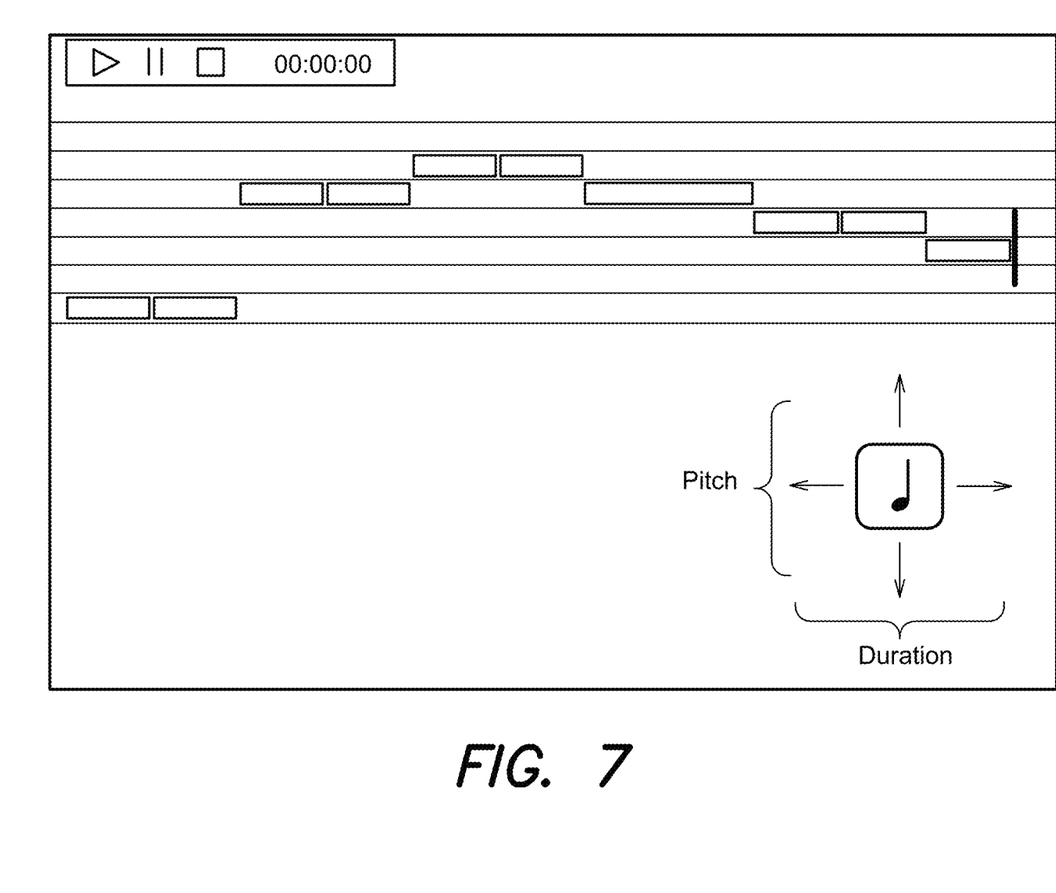
FIG. 7 illustrates the use of a multi-dimensional gesture for entry of MIDI data into a digital audio workstation.
Figure 8:
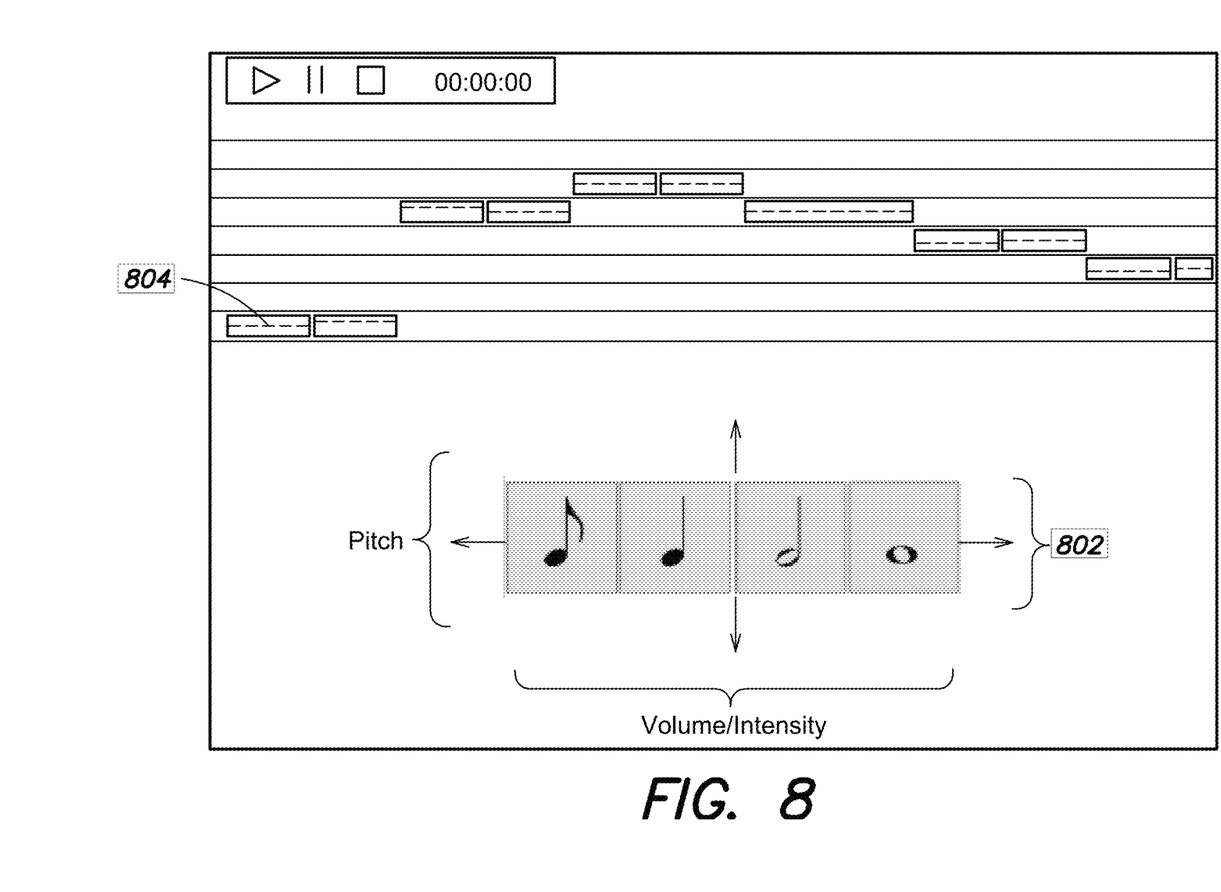
FIG. 8 illustrates the selection of a note duration accompanied by a two-dimensional gesture for specifying values of two parameters of a MIDI event.

Multidimensional gestures may also be used to enter MIDI notes into a digital audio workstation. In prior art systems, the process for adding a note requires at least two mouse operations. First, the user clicks at the desired temporal location and pitch level to create a new sound event with a default duration. Second, the length of the note is then adjusted to the desired length by clicking and dragging the sound event object within the project, or via keyboard shortcuts. With the multidimensional gesture input described herein, these two steps are combined into a single gesture, as illustrated in FIG. 7. The user touches or clicks the temporal location at which the note is to be added, and then drags the touch point or click point vertically and horizontally to define pitch and duration respectively. When the desired note is properly positioned and the correct duration is specified, the touch gesture is released, and the note is entered into the digital audio workstation project. In other implementations, the note duration is selected by the user from set of note duration icons 802, and the horizontal dimension may be mapped to another parameter, such as volume as indicated in FIG. 8. The volume for each event is represented by the vertical positioning of dotted line 804 within the bar representing the musical event.

The gesture input methods described herein may also be used with fretted string instruments such as a guitar. For example, a dimension of the input gesture may be mapped to a string position within a guitar tablature (TAB) staff, and another dimension may be mapped to a fret number. In various implementations, a vertical dimension is mapped to string position within a TAB staff and a horizontal dimension is mapped to the fret number. In other implementations, this mapping is revered, with the vertical dimension being mapped to fret number and the horizontal dimension mapped to string position within the TAB staff.

Figure 9:
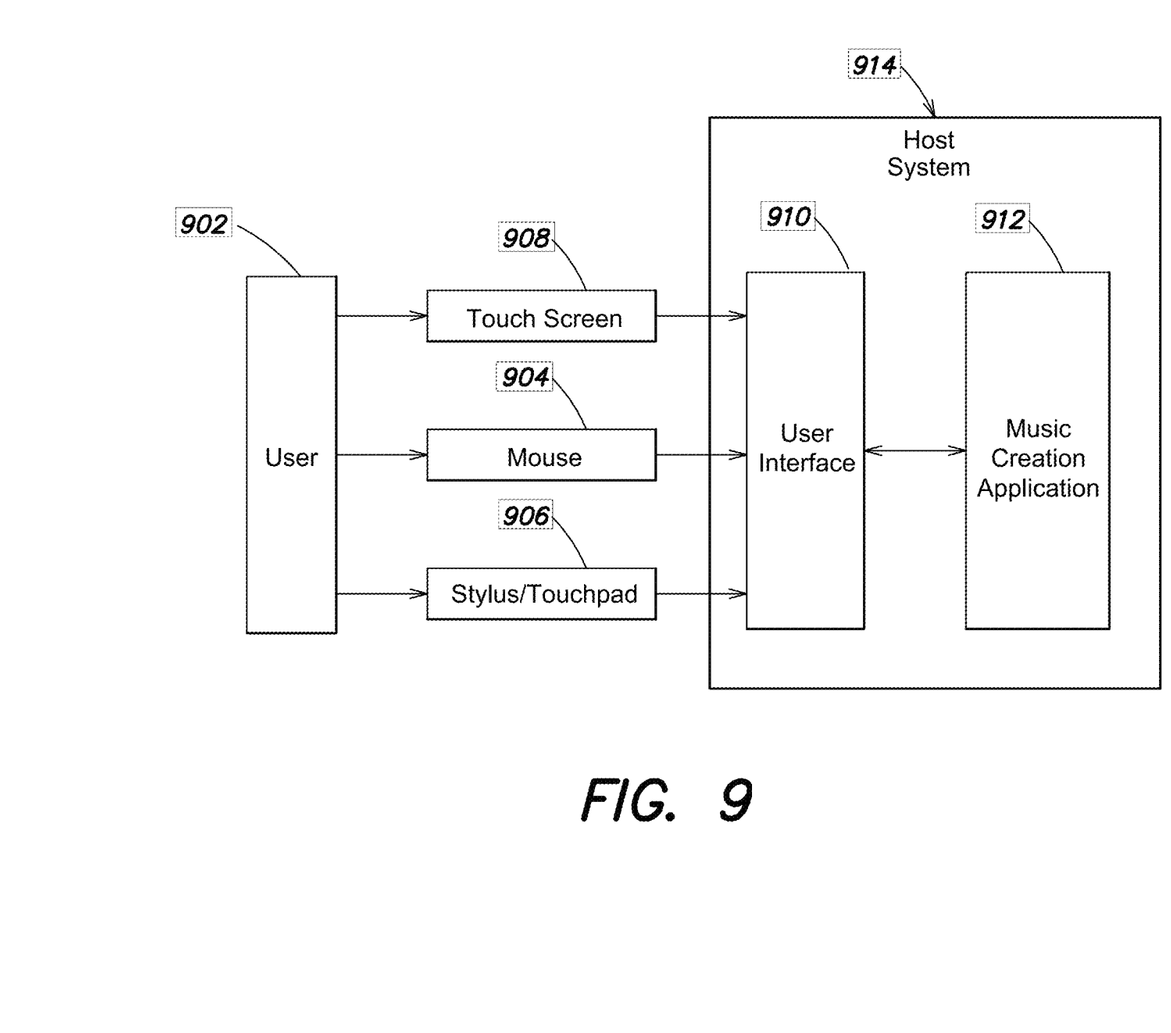
FIG. 9 is a high-level block diagram of a system for entering sound events into a music creation application using gestures.

FIG. 9 illustrates a system for multi-dimensional gesture input to a music creation application. User 902 uses an input device, such as a mouse 904 or stylus/touchpad 906, or a finger on touch screen 908 to interact with user interface 910 of music creation application 912. The music creation application is hosted on system 914, which may be a standalone personal computer or workstation, a tablet or a smartphone, or may be a networked client with the application running the cloud.

The various components of the system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, OLED displays, various stereoscopic displays including displays requiring viewer glasses and glasses-free displays, cathode ray tubes, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen/stylus and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of entering data into a music creation application, the method comprising:
    enabling a user of the music creation application to perform a gesture, wherein the gesture includes using one of a finger and an input device to:
        select a musical symbol displayed at a given location on a user interface of the music creation application for placement at an insertion location in a musical project, wherein the given location on the user interface is displaced with respect to a display in the user interface of the insertion location in the musical project;
        without releasing the selection, move the one of a finger and an input device in a plurality of dimensions, wherein each dimension of the plurality of dimensions is mapped to a corresponding parameter of the musical symbol, and the magnitude of the movement along a given dimension controls a value of the parameter corresponding to the given dimension; and
        release the selection to cause the musical symbol to be placed in the musical project at the insertion location with parameter values defined by the movement of the one of a finger and an input device in the plurality of dimensions.

2. The method of claim 1, wherein the musical symbol is a note of a specified duration.

3. The method of claim 2, wherein a first dimension of the plurality of dimensions is a vertical dimension and a magnitude of movement along the first dimension defines a diatonic pitch of the note.

4. The method of claim 2, wherein a first dimension of the plurality of dimensions is a vertical dimension and a magnitude of movement along the first dimension defines a chromatic inflection of the note.

5. The method of claim 2, wherein a second dimension of the plurality of dimensions is a horizontal dimension and a magnitude of movement along the second dimension defines a chromatic inflection of the note.

6. The method of claim 2, wherein a second dimension of the plurality of dimensions is a horizontal dimension and a magnitude of movement along the second dimension defines a diatonic pitch of the note.

7. The method of claim 1, wherein the gesture includes using a stylus input device and a vertical tilt of the stylus is mapped to a temporal duration of the selected musical symbol and a horizontal tilt is mapped to a chromatic inflection of the selected musical symbol.

8. The method of claim 1, wherein the gesture includes using a stylus input device, and the plurality of dimensions includes:
    a vertical dimension that defines a diatonic pitch of a selected musical symbol;
    a horizontal dimension that defines a temporal location at which the selected musical symbol is to be placed;
    a vertical tilt dimension that defines a chromatic inflection of the selected musical symbol; and
    a horizontal tilt dimension that defines a rhythmic duration of the musical symbol.

9. The method of claim 1, wherein the gesture includes using a stylus input device, and the plurality of dimensions includes:
    a vertical dimension that defines a diatonic pitch of a selected music symbol;
    a horizontal dimension that defines a temporal location at which the selected musical symbol is to be placed;
    a vertical tilt dimension that defines a rhythmic duration of the selected musical symbol; and
    a horizontal tilt dimension that defines a chromatic inflection of the musical symbol.

10. The method of claim 1, wherein the gesture includes using a stylus input device, and a stylus tip pressure on a tablet toggles between selecting a note for entry into the musical project and selecting a rest for entry into the musical project.

11. The method of claim 1, wherein the gesture includes using a stylus input device, and a stylus tip pressure activates the user interface of the music creation application to accept gestures that involve a tilt of the stylus along one or more angular dimensions.

12. The method of claim 1, wherein:
    the gesture is input via a mouse;
    selecting the musical symbol comprises clicking a button of the mouse; and
    the motion in the plurality of dimensions comprises moving in a horizontal dimension and a vertical dimension while continuing to press the mouse button.

13. The method of claim 12, wherein:
    the selected musical symbol is a musical note of a specified duration;
    movement in the vertical dimension controls a diatonic pitch of the musical note; and movement in the horizontal dimension controls a chromatic inflection of the musical note.

14. The method of claim 12, wherein:
the selected musical symbol is a musical note of a specified duration;
movement in the vertical dimension controls a chromatic inflection of the musical note; and
movement in the horizontal dimension controls a diatonic pitch of the musical note.

15. The method of claim 1, wherein a dimension of the plurality of dimensions is mapped to a parameter defining a duration of a musical rest.

16. The method of claim 1, wherein a first dimension of the plurality of dimensions is mapped to a diatonic pitch of the selected musical symbol and a second dimension of the plurality of dimensions is mapped to a rhythmic duration of the selected musical symbol.

17. The method of claim 1, wherein a first dimension of the plurality of dimensions is mapped to a string position within a guitar tablature (TAB) staff and a second dimension of the plurality of dimensions is mapped to a fret number.

18. A computer program product comprising:
a non-transitory computer-readable medium with computer-readable instructions encoded thereon, wherein the computer-readable instructions, when processed by a processing device instruct the processing device to perform a method of entering data into a music creation application, the method comprising:
enabling a user of the music creation application to perform a gesture, wherein the gesture includes using one of a finger and an input device to:
select a musical symbol displayed at a given location on a user interface of the music creation application for placement at an insertion location in a musical project, wherein the given location on the user interface is displaced with respect to a display in the user interface of the insertion location in the musical project;
without releasing the selection, move the one of a finger and an input device in a plurality of dimensions, wherein each dimension of the plurality of dimensions is mapped to a corresponding parameter of the musical symbol, and the magnitude of the movement along a given dimension controls a value of the parameter corresponding to the given dimension; and
release the selection to cause the musical symbol to be placed in the musical project at the insertion location with parameter values defined by the movement of the one of a finger and an input device in the plurality of dimensions.

19. A system comprising:
a memory for storing computer-readable instructions; and
a processor connected to the memory, wherein the processor, when executing the computer-readable instructions, causes the system to perform a method of entering data into a music creation application, the method comprising:
enabling a user of the music creation application to perform a gesture, wherein the gesture includes using one of a finger and an input device to:
select a musical symbol displayed at a given location on a user interface of the music creation application for placement at an insertion location in a musical project, wherein the given location on the user interface is displaced with respect to a display in the user interface of the insertion location in the musical project;
without releasing the selection, move the one of a finger and an input device in a plurality of dimensions, wherein each dimension of the plurality of dimensions is mapped to a corresponding parameter of the musical symbol, and the magnitude of the movement along a given dimension controls a value of the parameter corresponding to the given dimension; and
release the selection to cause the musical symbol to be placed in the musical project at the insertion location with parameter values defined by the movement of the one of a finger and an input device in the plurality of dimensions.

20. A method of entering data into a music creation application, the method comprising:
enabling a user of the music creation application to perform a gesture, wherein the gesture includes using a stylus input device to:
select a musical symbol displayed at a given location on a user interface of the music creation application for placement in a musical project;
without releasing the selection, move the stylus device in a plurality of dimensions including at least one of a horizontal and vertical dimension and a tilt dimension, wherein each dimension of the plurality of dimensions is mapped to a corresponding parameter of the musical symbol, and the magnitude of the movement along a given dimension controls a value of the parameter corresponding to the given dimension; and
release the selection to cause the musical symbol to be placed in the musical project with parameter values defined by the movement of the stylus input device in the plurality of dimensions.

21. A method of entering data into a music creation application, the method comprising:
enabling a user of the music creation application to:
use a mouse input device to select a musical symbol displayed at a given location on a user interface of the music creation application for placement;
without releasing the selection, move the mouse in a horizontal dimension and a in a vertical dimension, wherein each of the horizontal and vertical dimensions is mapped to a corresponding parameter of the musical symbol, and the magnitude of the movement along a given dimension controls a value of the parameter corresponding to the given dimension; and
release the selection to cause the musical symbol to be placed in the musical project with parameter values defined by the movement of the mouse in the horizontal and vertical dimensions.

22. A method of entering data into a music creation application, the method comprising:
enabling a user of the music creation application to perform a gesture using a finger on a touchscreen user interface of the music creation application to:
select a musical symbol displayed at a given location on a user interface of the music creation application for placement at an insertion location in a musical project, wherein the given location on the user interface is displaced with respect to a display in the user interface of the insertion location in the musical project;

without releasing the selection, move the finger in one of a horizontal and a vertical direction, wherein a magnitude of the movement along the one of the horizontal and vertical directions controls a value of a parameter of the musical symbol that is mapped to the one of the horizontal and vertical directions; and release the selection to cause the musical symbol to be placed in the musical project at the insertion location with a value of the parameter defined by the movement of the finger in the one of the horizontal and vertical directions.

\* \* \* \* \*